United States Patent
Vasanani et al.

(10) Patent No.: US 12,440,534 B2
(45) Date of Patent: *Oct. 14, 2025

(54) STABLE READY TO DILUTE COMPOSITION OF CARFILZOMIB

(71) Applicant: Kashiv BioSciences, LLC, Piscataway, NJ (US)

(72) Inventors: Paras Rasiklal Vasanani, Ahmedabad, IN (US); Sandip Pareshbhai Mehta, Ahmedabad, IN (US)

(73) Assignee: Kashiv BioSciences, LLC, Piscataway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,730

(22) Filed: Apr. 19, 2024

(65) Prior Publication Data
US 2024/0269224 A1    Aug. 15, 2024

Related U.S. Application Data

(63) Continuation of application No. PCT/IB2022/060145, filed on Oct. 21, 2022.

(30) Foreign Application Priority Data

Oct. 21, 2021  (IN) .............................. 202121047991

(51) Int. Cl.
*A61K 9/00* (2006.01)
*A61K 9/08* (2006.01)
*A61K 38/07* (2006.01)

(52) U.S. Cl.
CPC ............ *A61K 38/07* (2013.01); *A61K 9/0019* (2013.01); *A61K 9/08* (2013.01)

(58) Field of Classification Search
CPC ........................... A61K 9/0019; A61K 9/0029
See application file for complete search history.

(56) References Cited

U.S. PATENT DOCUMENTS

| | | | |
|---|---|---|---|
| 6,107,333 A * | 8/2000 | Andersson | A61P 33/00 549/510 |
| 2018/0117054 A1 * | 5/2018 | Shete | A61K 47/12 |
| 2019/0085026 A1 | 3/2019 | Dehury et al. | |
| 2019/0351007 A1 | 11/2019 | Mohan et al. | |
| 2023/0158099 A1 * | 5/2023 | Vasanani | A61K 47/18 514/19.3 |

FOREIGN PATENT DOCUMENTS

| | | | | |
|---|---|---|---|---|
| WO | WO-2015/198257 A1 | 12/2015 | | |
| WO | WO-2016116882 A2 * | 7/2016 | ........... | C07K 5/1008 |
| WO | WO-2018047074 A1 * | 3/2018 | ........... | A61K 31/175 |
| WO | WO-2021/209947 A1 | 10/2021 | | |

OTHER PUBLICATIONS

International Search Report and Written Opinion for PCT/IB2022/060145 dated Feb. 28, 2023 (9 pages).

* cited by examiner

*Primary Examiner* — Micah Paul Young
(74) *Attorney, Agent, or Firm* — Goodwin Procter LLP

(57) ABSTRACT

The invention is directed to room temperature stable injectable formulations of carfilzomib or its pharmaceutically acceptable derivatives thereof in the form of ready to dilute solution and concentrates with no hemolytic potential. Further the invention is directed to a method for treating patients with relapsed or refractory multiple myeloma by administering such composition.

16 Claims, No Drawings

STABLE READY TO DILUTE COMPOSITION OF CARFILZOMIB

CROSS-REFERENCE TO RELATED APPLICATIONS

This application is a Continuation of International Application No. PCT/IB2022/060145, filed on Oct. 21, 2022, which claims the benefit of and priority to Indian Patent Application number 202121047991, filed on Oct. 21, 2021, each of which is incorporated by reference herein in its entirety.

FIELD OF THE INVENTION

The invention is directed to room temperature stable injectable formulations of carfilzomib or its pharmaceutically acceptable derivatives thereof in the form of ready to dilute solution and concentrates. Further the invention is directed to a method for treating patients with relapsed or refractory multiple myeloma which includes method of administering reconstituted ready to dilute solution comprising mixing of component 1 and component 2 to form reconstituted ready to dilute solution wherein the component 1 is stable when stored at room temperature for at least six months.

BACKGROUND

Carfilzomib is a selective proteasome inhibitor indicated for the treatment of multiple myeloma. Carfilzomib is a tetrapeptide epoxyketone proteasome inhibitor that irreversibly binds to the N-terminal threonine-containing active sites of the 20S proteasome, the proteolytic core particle within the 26S proteasome.

Carfilzomib is commercially marketed under the name Kyprolis® in single dose vials containing 10 mg, 30 mg and 60 mg of the active ingredient. Each vial, in addition to lyophilized carfilzomib, also contains sulfobutylether beta-cyclodextrin, citric acid and sodium hydroxide for pH adjustment.

The problems associated with the commercially available formulation is that the reconstitution of the lyophilized product is complex and cumbersome. Since process of reconstitution is complex which comprises aseptically reconstituting each vial by slowly injecting sterile water for injection through the stopper, directing the water onto the inside wall of the vial in order to ensure less foam formation. If foaming occurs, one has to wait till the foam is settled down and subsides till the solution becomes clear. Also, in reconstitution products it is of great importance to visually inspect the solution before administration and a reconstituted solution that appears to have any discoloration or particulate matter must be discarded. Also, it is known that if there is excess foam then it may lead to loss in potency.

There have been efforts to obtain improved carfilzomib compositions. For instance, substituted cyclodextrin additives have been explored to enhance the solubility of carfilzomib.

As carfilzomib is sensitive to degradation, the development of cost-effective room temperature stable carfilzomib injection is very challenging. There remains a need for improved formulations of carfilzomib having improved case of manufacture, means of administration, and stability over time, especially when stored under room temperature.

SUMMARY OF THE INVENTION

It is an object of the invention to provide room temperature stable ready to dilute injectable formulation comprising Carfilzomib or it pharmaceutically acceptable derivatives.

It is another object of the present invention to provide methods for treating patients with multiple myeloma by administering room temperature stable ready to dilute injectable formulations comprising carfilzomib or its pharmaceutically acceptable derivatives.

Further, the object of the present invention is to provide a method for treating patients with relapsed or refractory multiple myeloma which includes method of administering reconstituted ready to dilute solution comprising mixing of component 1 and component 2 to form reconstituted ready to dilute solution followed by diluting the reconstituted ready to dilute solution with infusion media; wherein the component 1 is room temperature stable ready to dilute parenteral formulation of carfilzomib or its pharmaceutically acceptable salts; and component 2 is acidifying agent.

In one aspect of the present invention provides room temperature stable carfilzomib formulation which is stable over a period of at least six months when stored at 25° C. and relative humidity of 60%.

In one aspect of the present invention provides room temperature stable carfilzomib formulation which is stable over a period of at least six months when stored at 25° C. and relative humidity of 60%; wherein the total impurity during storage period of six month is selected from group consisting of not more than 6%, not more than 5%, not more than 4%, not more than 3%, not more than 2%, not more than 1.5%, not more than 1%, not more than 0.5%, not more than 0.4%, not more than 0.3%.

DETAILED DESCRIPTION OF THE INVENTION

Commercially available Kyprolis® (carfilzomib) is available with 10 mg, 30 mg and 60 mg vials which gives reconstituted solution of 5 mL, 15 mL and 30 mL respectively. So, for required doses multiple vials to be reconstituted then to be mixed and further dilution for exact dosing. Due to multiple vial dilution and multiple steps to get desired drug administration, chances of errors are more, and it is tedious process for nursing staff. So, there is a need to solve this problem of multiple vial dilution.

As used in the specification and the appended claims, the singular forms "a," "an" and "the" include plural referents unless the context clearly dictates otherwise.

As used herein, the "about" term refers to the deviation of ±5% from the said value.

As used herein, the term "optional" or "optionally" means that the subsequently described event or circumstance may or may not occur.

The formulation of the present invention contains "carfilzomib" or its pharmaceutically acceptable derivatives. The pharmaceutically acceptable derivatives include pharmaceutically acceptable salts, solvates, hydrates, anhydrates, enantiomers, isomers, polymorphs, tautomers or mixture thereof.

Pharmaceutically acceptable salts are salts that retain the desired biological activity of the parent compound and do not impart undesirable toxicological effects. Examples of such salts are acid addition salts formed with inorganic acids, for example, hydrochloric, hydrobromic, sulfuric, phosphoric, and nitric acids and the like; salts formed with organic acids such as acetic, oxalic, tartaric, succinic, maleic, fumaric, gluconic, citric, malic, methanesulfonic, ptoluenesulfonic, napthalenesulfonic, and polygalacturonic acids, and the like; salts formed from elemental anions such as chloride, bromide, and iodide; salts formed from metal hydroxides, for example, sodium hydroxide, potassium hydroxide, calcium hydroxide, lithium hydroxide, and magnesium hydroxide; salts formed from metal carbonates, for example, sodium carbonate, potassium carbonate, calcium carbonate, and magnesium carbonate; salts formed from metal bicarbonates, for example, sodium bicarbonate and potassium bicarbonate; salts formed from metal sulfates, for example, sodium sulfate and potassium sulfate; and salts formed from metal nitrates, for example, sodium nitrate and potassium nitrate.

The term "stable formulation" or "stabilized formulation" refers to any preparation of carfilzomib having sufficient physical and chemical stability to allow storage at a convenient temperature, for a reasonable period of time.

As used herein, the term "room temperature" refers to temperature between about 15° C. to about 40° C. In one embodiment it is 25° C.

As used herein, the term "carfilzomib impurity" refers to any compound resulting from the chemical degradation of carfilzomib. Exemplary degradation pathways include but not limited to amide and/or epoxide hydrolysis, oxidation, epimerization, and products resulting from oxirane-ring opening with various nucleophiles.

As used herein, the term "ready to dilute" refers to a formulation of carfilzomib or its pharmaceutically acceptable derivatives thereof which can be directly combined with an infusion media (e.g., dextrose solution, water for injection, Ringer's solution, isotonic sodium chloride solution, suitable non-aqueous solvents or any other infusion medium) and then administered to a patient. In some embodiments, the ready to dilute formulation may be provided as a single vial containing the injectable formulation comprising carfilzomib or its pharmaceutically acceptable derivatives. In one embodiment, optionally, the ready to dilute formulation may be further diluted with other suitable excipients before combining with infusion media.

As used herein, the term "component 1" refers to a ready to dilute formulation of carfilzomib or its pharmaceutically acceptable derivatives thereof.

As used herein, the term "component 2" refers to an acidifying agent which is reconstituted with the component 1 to form reconstituted ready to dilute formulation which can optionally be further added or mixed into infusion media. The Component 2 is used in clear solution form or powder form.

As used herein, the term "reconstituted ready to dilute" refers to a formulation of carfilzomib or its pharmaceutically acceptable derivatives thereof obtained after mixing the component 1 and the component 2 before adding into infusion media.

The term "ready to use" refers to any preparation of carfilzomib or its pharmaceutically acceptable derivatives thereof which is administered to patient directly without any further dilution or processing.

The term "hemolytic potential" refers to ability of fluid to degrade the red blood cell and releases hemoglobin. The hemolytic potential is measured as release of hemoglobin from blood cells.

The formulations of the present invention are injectable formulation. The injectable formulation of carfilzomib or its pharmaceutically acceptable derivatives according to present invention may be administered via any route including intramuscular, intravenous, or subcutaneous. Preferably, the injectable formulation of the present invention may be administered intravenously. The formulations of carfilzomib or its pharmaceutically acceptable derivatives thereof is in the form of liquid concentrates, ready to dilute or ready to use solutions. The injectable formulations of the present invention may be packaged within a conventional sterile vial or other suitable sterile container.

In one embodiment, the room temperature stable ready to dilute injectable formulation comprising carfilzomib or its pharmaceutically acceptable derivatives contains carfilzomib at concentrations from about 5 mg/mL to about 350 mg/mL. In one embodiment, the concentrations of carfilzomib are in the range from about 10 mg/mL to about 100 mg/mL, or about 15 mg/mL to about 60 mg/mL, or about 10 mg/mL to about 60 mg/mL. In one preferred embodiment, the injectable formulation is the one having carfilzomib at a concentration of about 10 mg/mL or about 60 mg/mL. In one embodiment of the present invention the concentration of carfilzomib or its pharmaceutically acceptable salts thereof in component 1 is different than the concentration of carfilzomib or its pharmaceutically acceptable salts in reconstituted ready to dilute injectable composition. In one embodiment of the present invention the concentration of carfilzomib or its pharmaceutically acceptable salts thereof in component 1 is lower than the concentration of carfilzomib or its pharmaceutically acceptable salts in reconstituted ready to dilute injectable composition. In one embodiment of the present invention the concentration of carfilzomib or its pharmaceutically acceptable salts thereof in component 1 is about 60 mg/ml. In one embodiment of the present invention the concentration of carfilzomib or its pharmaceutically acceptable salts thereof in reconstituted ready to dilute injectable composition is about 40 mg/ml.

In one embodiment, the present invention provides room temperature stable injectable ready to dilute formulation comprising carfilzomib or its pharmaceutically acceptable derivatives thereof and one or more solvent. In one embodiment, the ready to dilute compositions can include one or more solvent selected from ethanol, isopropyl alcohol, benzyl alcohol, propylene glycol, polyethylene glycol, glycerol, N,N-dimethylacetamide (N,N-DMA), N-methylpyrrolidone, dimethylsulfoxide (DMSO), diethylene glycol monoethyl ethers, caprylocaproyl polyoxyl-8 glycerides, glycofurol, or mixtures thereof. In preferred embodiments the formulations can include ethanol, dimethylacetamide, propylene glycol, polyethylene glycol, or mixtures thereof. In one embodiment, the ratio of the one or more solvent used and the amount of carfilzomib or its pharmaceutically acceptable derivatives can vary from about 100:1 to 8:1.

In one embodiment, the room temperature stable injectable formulation of the present invention may optionally comprise one or more pharmaceutically acceptable excipients, such as a buffer, surfactant, antioxidant and preservative.

In one embodiment, the composition of the present invention has one or more pharmaceutically acceptable surfactants. Suitable surfactants include anionic, cationic, amphoteric and non-ionic surfactants, Exemplary non-ionic surfactants include polyethylene oxides, for instance PEG 300 or PEG 400. Pharmaceutically acceptable surfactant for this application include, but are not limited to polysorbate or polyethoxylated castor oil, Polyoxyl 20 stearate, Polyoxyl 35 castor oil, poloxamer, polyoxyethylene sorbitan monoisostearate, polyethylene glycol 40 sorbitan diisostearate, Polyoxyl 40 Hydrogenated castor oil, Polysorbate, Polysorbate 20, Polysorbate 40, Polyoxyl 60 stearate, Polysorbate 80, Polysorbate 60, poloxamer 331, polyoxyethylene fatty acid esters, Polyoxyl 40 castor oil, poloxamer 188, polyoxyethylene polyoxypropylene 1800, oleic acid, Sodium desoxycholate, Sodium lauryl sulfate, Sorbitan monolaurate, Sorbitan monooleate, Sorbitan monopalmitate, Sorbitan trioleate, N-Carbamoyl methoxypolyethylene glycol 2000-1,2-distearol, myristic acid, Steareth, Stearic acid, Polyoxyl 40 stearate, Sucrose stearate, Tocopherol, Triglyceride synthetic, Trimyristin, Tristearin, magnesium stearate, lecithin, lauryl sulfate, Vitamin E, vitamin E-TPGS, egg yolk phosphatides, docusate sodium, dimyristoyl phosphatidylglycerol, dimyristoyl lecithin, Capryol 90 (propylene glycol monocaprylate), Capryol PGMC (propylene glycol monocaprylate), deoxycholate, cholesterol, Cremophor EL, Propylene glycol alginate, Croval A-10 (PEG 60 almond glycerides), Labrafil 1944 (oleoyl macrogol-6 glycerides), Labrafil 2125 (linoleoyl macrogol-6 glycerides), Labrasol (caprylocaproyl macrogol-8 glycerides), Lauroglycol 90 (propylene glycol monolaurate), Lauroglycol FCC (propylene glycol laurate), calcium stearate, Lecithin Centromix E, Lecithin Centrophase 152, Lecithin Centrol 3F21B, POE 26 glycerin, Olepal isosteariques (PEG-6 isostearate), Plurol diisostearique (polyglycerol-3-diisostearate), Plurol Oleique CC, POE 20 Sorbitan trioleate, Tagat TO (polyoxyethylene glycerol triolcate), or Solutol (macrogol-15 hydroxystearate). In some embodiments, optionally the surfactant is present in an about 10% to about 90% of the total weight of the ready to dilute formulation, preferably from about 20% to about 80% of the total weight of the ready to dilute formulation, preferably from about 30% to about 60% of the total weight of the ready to dilute formulation.

In one embodiment, the composition of the present invention has buffer selected from mixtures of a weak acid and alkali metal salt (e.g., Sodium, potassium) and the conjugate base of the weak acid. Suitable buffers include, for example, buffers selected from the group consisting of citric acid, acetic acid, maleic acid, phosphoric acid, succinic acid, tartaric acid, ascorbic acid, benzene sulfonic acid, oxalic acid, fumaric acid, gluconic acid, malic acid, methane sulfonic acid, p-toluenesulfonic acid, naphthalene sulfonic acid, lacturonic acids, lactic acid, lactobionic acid, edetic acid, gentisic acid, meta phosphoric acid, nitric acid, pentetic acid, glycolic acid as well as the counter ion salts thereof.

In one embodiment, the composition of the present invention has one or more antioxidant selected from butylated hydroxytoluene, butylated hydroxy anisole, propyl gallate, and C.-tocopherol, DL-tocopherol, C-tocopherol acetate, C.-tocopherol Tocopherol Polyethylene Glycol Succinate (Vitamin E TPGS), L-cysteine ascorbyl palmitate thioglycolic acid, sodium metabisulfite (SMBS), ascorbic acid, sodium formaldehyde sulfoxylate, or hydrophilic antioxidants, including sodium EDTA and thioglycerol. Most typically, the concentration of the antioxidant is between 0.005% and 5% weight/weight of the total composition.

In one embodiment, the composition of the present invention has preservative selected from phenol, thimerosal, chlorobutanol, benzyl alcohol, m-cresol, phenoxyethanol, methylparaben and propylparaben typically at a concentration of between 0.001% weight/weight and about 5% weight/weight of the total composition and is most typically between about 0.003% and about 2.0% weight/weight of the total composition.

In one embodiment, component 2 comprises acidifying agent selected from citric acid, acetic acid, maleic acid, phosphoric acid, succinic acid, tartaric acid, ascorbic acid, benzene sulfonic acid, oxalic acid, fumaric acid, gluconic acid, malic acid, methane sulfonic acid, p-toluenesulfonic acid, naphthalene sulfonic acid, lacturonic acids, lactic acid, lactobionic acid, edetic acid, gentisic acid, meta phosphoric acid, nitric acid, pentetic acid, glycolic acid Cystiene HCL. The purpose of using acidifying agents for the present invention is to maintain the acidic pH thereby solubilizing carfilzomib or its pharmaceutically acceptable salts in infusion media. Further, the purpose of using acidifying agents for the present invention is to avoid the precipitation of drug in infusion media.

Certain compounds have been identified as impurities obtained from carfilzomib degradation and have been analysed on stability samples such as [Acid Impurity] (S)-2-((S)-4-methyl-2-((S)-2-(2-morpholinoacetamido)-4-phenyl butanamido) pentanamido)-3-phenylpropanoic acid; [Diastereomer impurity] (S)-4-methyl-N—((R)-1-(((S)-4-methyl-1-((R)-2-methyloxiran-2-yl)-1-oxopentan-2-yl) amino)-1-oxo-3-phenylpropan-2-yl)-2-((S)-2-(2-morpholinoacetamido)-4 phenyl butanamido) pentanamide; [Phenol impurity] 2,3,4,5,6-pentaflurophenol;

[Diol impurity] (S)—N—((S)-1-(((2R,4S)-1,2-dihydroxy-2,6-dimethyl-3-oxoheptan-4-yl)amino)-1-oxo-3-phenylpropan-2-yl)-4-methyl-2-((S)-2-(2-morpholino acctamido)-4-phenylbutanamido)pentanamide; [Chloro impurity] (S)—N—((S)-1-(((2S,4S)-1-chloro-2-hydroxy-2,6-dimethyl-3-oxoheptan-4-yl)amino)-1-oxo-3-phenylpropan-2-yl)-4-methyl-2-((S)-2-(2-morpholinoacetamido)-4-phenylbutanamido)pentanamide; [N-oxide impurity] 4-((4S,7S,10S,13S)-10-benzyl-7-isobutyl-15-methyl-13-((R)-2-methyloxirane-2-carbonyl)-2,5,8,11-tetraoxo-4-phenethyl-3,6,9,12-tetraazahexadecyl)morpholine-4-oxide.

In one embodiment, a room temperature stable formulation which contains no more than total of 6% of impurities formed over the storage period. In one embodiment, a room temperature stable formulation which contains no more than total of 5% of impurities formed over the storage period. In one embodiment, a room temperature stable formulation which contains no more than total of 4% of impurities formed over the storage period. In one embodiment, a room temperature stable formulation which contains no more than total of 3% of impurities formed over the storage period. In one embodiment, a room temperature stable formulation which contains no more than total of 2% of impurities formed over the storage period. In one embodiment, a room temperature stable formulation which contains no more than total of 1% of impurities formed over the storage period. In one embodiment, a room temperature stable formulation which contains no more than total of 0.5% of impurities formed over the storage period. In one embodiment, the storage period of the formulation of invention is reasonable period of time in which the formulation has sufficient chemical and physical stability. The storage period is selected from at least six months, at least one year, or at least 2 years.

In one embodiment, the room temperature stable formulation refers to any preparation of carfilzomib having sufficient stability to allow storage at a room temperature, such as between about 15° C. to about 40° C.; preferably between about 20° C. and about 40° C.; more preferably between about 25° C. and about 40° C.; most preferably at temperature between about 20° C. and about 25° C. It is to be understood that the stability of the formulation of carfilzomib in the temperature range of the embodiments is always accompanied by additional parameter of 60% humidity. In preferred embodiments of the present invention, stability of room temperature stable formulation may be assessed after storing the formulation of the present invention in a sealed, sterile container at 60% relative humidity at a temperature of 25° C.

In one embodiment, after storage for six months at 75% RH and at temperature of 40° C., the carfilzomib composition has no more than 6% of total impurity by HPLC method. In one embodiment, after storage for six months at 75% RH and at temperature of 40° C., the carfilzomib composition has no more than 5% of total impurity by HPLC method. In one embodiment, after storage for six months at 75% RH and at temperature of 40° C., the carfilzomib composition has no more than 4% of total impurity by HPLC. In one embodiment, after storage for six months at 75% RH and at temperature of 40° C., the carfilzomib composition has no more than 3% of total impurity by HPLC. In one embodiment, after storage for six months at 75% RH and at temperature of 40° C., the carfilzomib composition has no more than 2% of total impurity by HPLC. In one embodiment, after storage for six months at 75% RH and at a temperature of 40° C., the carfilzomib composition has no more than 1.5% of total impurity by HPLC. In one embodiment, after storage for six months at 75% RH and at a temperature of 40° C., the carfilzomib composition has no more than 1% of total impurity by HPLC. In one embodiment, after storage for six months at 75% RH and at a temperature of 40° C., the carfilzomib composition has no more than 0.5% of total impurity by HPLC.

In one embodiment, after storage for six months at 60% RH and at temperature of 25° C., the carfilzomib composition has no more than 6% of total impurity by HPLC method. In one embodiment, after storage for six months at 60% RH and at temperature of 25° C., the carfilzomib composition has no more than 5% of total impurity by HPLC method. In one embodiment, after storage for six months at 60% RH and at temperature of 25° C., the carfilzomib composition has no more than 4% of total impurity by HPLC. In one embodiment, after storage for six months at 60% RH and at temperature of 25° C., the carfilzomib composition has no more than 3% of total impurity by HPLC. In one embodiment, after storage for six months at 60% RH and at temperature of 25° C., the carfilzomib composition has no more than 2% of total impurity by HPLC. In one embodiment, after storage for six months at 60% RH and at a temperature of 25° C., the carfilzomib composition has no more than 1.5% of total impurity by HPLC. In one embodiment, after storage for six months at 60% RH and at a temperature of 25° C., the carfilzomib composition has no more than 1% of total impurity by HPLC. In one embodiment, after storage for six months at 60% RH and at a temperature of 25° C., the carfilzomib composition has no more than 0.5% of total impurity by HPLC. In one embodiment, after storage for six months at 60% RH and at a temperature of 25° C., the carfilzomib composition has no more than 0.4% of total impurity by HPLC. In one embodiment, after storage for six months at 60% RH and at a temperature of 25° C., the Carfilzomib composition has no more than 0.3% of total impurity by HPLC.

In one embodiment, the present invention provides room temperature stable injectable formulation comprising carfilzomib or its pharmaceutically acceptable salts thereof and one or more solvents. In one embodiment, the present invention provides room temperature stable injectable formulation comprising carfilzomib or its pharmaceutically acceptable salts thereof; one or more solvent; and optionally one or more pharmaceutically acceptable excipients selected from antioxidant, buffer, preservative, and surfactant.

In one embodiment, the present invention provides room temperature stable injectable formulation comprising carfilzomib or its pharmaceutically acceptable salts thereof and one or more solvents; wherein the injectable formulation includes ready to dilute, ready to use and liquid concentrate. In a preferred embodiment, the injectable formulation of the present invention includes room temperature stable ready to dilute solution.

In one embodiment, the present invention provides room temperature stable ready to dilute injectable formulation comprising carfilzomib or its pharmaceutically acceptable salts thereof and at least one pharmaceutically acceptable excipient.

In one embodiment, the pharmaceutically acceptable excipient in the composition of the present invention is selected from solvents, antioxidant, buffer, preservative, and surfactant. In one embodiment, the present invention provides room temperature stable ready to dilute injectable formulation comprising carfilzomib or its pharmaceutically acceptable salts thereof and one or more solvents.

In one embodiment, the present invention provides room temperature stable ready to dilute injectable formulation comprising carfilzomib or its pharmaceutically acceptable salts thereof; one or more solvents; and optionally one or more pharmaceutically acceptable excipients selected from antioxidant, buffer, preservative, and surfactant.

In one embodiment, the present invention provides stable ready to dilute injectable formulation comprising carfilzomib or its pharmaceutically acceptable derivatives thereof and one or more solvents; wherein the formulation contains no more than 6% total impurities upon storage of six months when stored at 25° C. and 60% relative humidity.

In one embodiment, the present invention provides stable ready to dilute injectable formulation comprising carfilzomib or its pharmaceutically acceptable salts thereof; one or more solvent; and optionally one or more pharmaceutically acceptable excipients selected from antioxidant, buffer, preservative, and surfactant; wherein the formulation contains no more than 6% of total impurities upon storage of six months when stored at 25° C. and 60% relative humidity.

In one embodiment, the present invention provides stable ready to dilute injectable formulation comprising carfilzomib or its pharmaceutically acceptable salts thereof; one or more solvent; and optionally one or more pharmaceutically acceptable excipients selected from antioxidant, buffer, preservative, and surfactant; wherein the formulation contains no more than 5% of total impurities upon storage of six months when stored at 25° C. and 60% relative humidity.

In one embodiment, the present invention provides stable ready to dilute injectable formulation comprising carfilzomib or its pharmaceutically acceptable salts thereof; one or more solvent; and optionally one or more pharmaceutically acceptable excipients selected from antioxidant, buffer, preservative, and surfactant; wherein the formulation contains no more than 4% of total impurities upon storage of six months when stored at 25° C. and 60% relative humidity.

In one embodiment, the present invention provides stable ready to dilute injectable formulation comprising carfilzomib or its pharmaceutically acceptable salts thereof; one or more solvent; and optionally one or more pharmaceutically acceptable excipients selected from antioxidant, buffer, preservative, and surfactant; wherein the formulation contains no more than 3% of total impurities upon storage of six months when stored at 25° C. and 60% relative humidity.

In one embodiment, the present invention provides stable ready to dilute injectable formulation comprising carfilzomib or its pharmaceutically acceptable salts thereof; one or more solvent; and optionally one or more pharmaceutically acceptable excipients selected from antioxidant, buffer, preservative, and surfactant; wherein the formulation contains no more than 2% of total impurities upon storage of six months when stored at 25° C. and 60% relative humidity.

In one embodiment, the present invention provides stable ready to dilute injectable formulation comprising carfilzomib or its pharmaceutically acceptable salts thereof; one or more solvent; and optionally one or more pharmaceutically acceptable excipients selected from antioxidant, buffer, preservative, and surfactant; wherein the formulation contains no more than 1.5% of total impurities upon storage of six months when stored at 25° C. and 60% relative humidity.

In one embodiment, the present invention provides stable ready to dilute injectable formulation comprising carfilzomib or its pharmaceutically acceptable salts thereof; one or more solvent; and optionally one or more pharmaceutically acceptable excipients selected from antioxidant, buffer, preservative, and surfactant; wherein the formulation contains no more than 1.0% of total impurities upon storage of six months when stored at 25° C. and 60% relative humidity.

In one embodiment, the present invention provides stable ready to dilute injectable formulation comprising carfilzomib or its pharmaceutically acceptable salts thereof; one or more solvent; and optionally one or more pharmaceutically acceptable excipients selected from antioxidant, buffer, preservative, and surfactant; wherein the formulation contains no more than 0.5% of total impurities upon storage of six months when stored at 25° C. and 60% relative humidity.

It is always desirable and beneficial to have stable room temperature injectable formulation which has commercial and handling benefits over formulation stored as stringent conditions such as 2-8° C. However, it is very challenging to obtain injectable formulation which is stable at room temperature having less impurity or impurity level within acceptable limit by drug approval authority.

During stability study period, surprisingly it has been found that the ready to dilute injectable solution without acidifying agent has a significantly better impurity profile than ready to dilute injectable solution with acidifying agent. Thus, acidifying agent impart negative impact on the stability of formulation at room temperature and generates more impurities during stability period than the formulation without acidifying agent. The better impurity profile according to present invention includes difference in the total impurities obtained during the stability period upon analysis of formulation sample on HPLC.

In one embodiment, the present invention provides room temperature stabilized injectable formulation comprising carfilzomib and its pharmaceutically acceptable salts which does not contain any acidifying agent.

In one embodiment, the present invention provides room temperature stabilized injectable formulation comprising Carfilzomib and its pharmaceutically acceptable salts which does not contain any acidifying agent during the stability period of the formulation.

In one embodiment, the present invention provides room temperature stable ready to dilute injectable formulation comprising Carfilzomib and its pharmaceutically acceptable salts; one or more solvent; and optionally one or more excipients selected from antioxidant, buffer and surfactant; and does not contain any acidifying agent during the stability period of the formulation.

In one embodiment, the present invention provides room temperature stable ready to dilute injectable formulation comprising carfilzomib and its pharmaceutically acceptable salts; one or more solvent; and optionally one or more excipients selected from antioxidant, buffer and surfactant; and does not contain any acidifying agent during the stability period of the formulation.

In one embodiment of present invention is directed to delivery of room temperature stable carfilzomib injectable ready to dilute formulation, which once diluted to appropriate injection (especially infusion, most particularly IV infusion) concentrations, it may be administered in appropriate amounts for treating carfilzomib responsive conditions known in the art.

In one embodiment of the present invention is provided a method for treating patients with relapsed or refractory multiple myeloma by administering room temperature stable ready to dilute or ready-to-use parenteral formulation of carfilzomib either alone or in combination with dexamethasone or lenalidomide plus dexamethasone.

In one embodiment of the present invention is provided a method for treating patients with relapsed or refractory multiple myeloma comprises administering room temperature stable ready to dilute injectable formulation of carfilzomib or its pharmaceutically acceptable salts thereof; and one or more solvents; wherein the formulation contains no more than 6% total impurities upon storage period of formulation. In one embodiment the method of treating patients with relapsed or refractory multiple myeloma includes administering the formulation of carfilzomib or its pharmaceutically acceptable salts that contains no more than 5% total impurities upon storage period of formulation. In one embodiment the method of treating patients with relapsed or refractory multiple myeloma includes administering the formulation of carfilzomib or its pharmaceutically acceptable salts that contains no more than 4% total impurities upon storage period of formulation. In one embodiment the method of treating patients with relapsed or refractory multiple myeloma includes administering the formulation of carfilzomib or its pharmaceutically acceptable salts that contains no more than 3% total impurities upon storage period of formulation. In one embodiment the method of treating patients with relapsed or refractory multiple myeloma includes administering the formulation of carfilzomib or its pharmaceutically acceptable salts that contains no more than 2% total impurities upon storage period of formulation. In one embodiment the method of treating patients with relapsed or refractory multiple myeloma includes administering the formulation of carfilzomib or its pharmaceutically acceptable salts that contains no more than 1.5% total impurities upon storage period of formulation. In one embodiment the method of treating patients with relapsed or refractory multiple myeloma includes administering the formulation of carfilzomib or its pharmaceutically acceptable salts that contains no more than 1% total impurities upon storage period of formulation. In one embodiment the method of treating patients with relapsed or refractory multiple myeloma includes administering the formulation of carfilzomib or its pharmaceutically acceptable salts that contains no more than 0.5% total impurities upon storage period of formulation.

In one embodiment of the present invention is provided the method for treating patients with relapsed or refractory multiple myeloma comprises administering room temperature stable ready to dilute injectable formulation of carfilzomib or its pharmaceutically acceptable salts thereof, wherein the ready to dilute injectable formulation is stable for one month when stored at 25° C. and 60% relative humidity. Preferably in one embodiment of the present invention is provided the method for treating patients with relapsed or refractory multiple myeloma comprises administering room temperature stable ready to dilute injectable formulation of carfilzomib or its pharmaceutically acceptable salts thereof, wherein the ready to dilute injectable formulation is stable for three months when stored at 25° C. and 60% relative humidity. More preferably, in one embodiment of the present invention is provided the method for treating patients with relapsed or refractory multiple myeloma comprises administering room temperature stable ready to dilute injectable formulation of carfilzomib or its pharmaceutically acceptable salts thereof, wherein the ready to dilute injectable formulation is stable for six months when stored at 25° C. and 60% relative humidity.

In one embodiment of the present invention is provided a method for treating patients with relapsed or refractory multiple myeloma which includes method of administering reconstituted ready to dilute solution comprising mixing of component 1 and component 2 before diluting with infusion media; wherein the component 1 comprises room temperature stable ready to dilute parenteral formulation of carfilzomib or its pharmaceutically acceptable salts and component 2 is acidifying agent.

In one embodiment of the present invention component 2 comprises the acidifying agent which is selected from citric acid, malic acid, orthophosphoric acid (OPA, also known as phosphoric acid), fumaric acid or mixtures thereof.

In one embodiment the ratio of acidifying agent used in comparison to carfilzomib or its pharmaceutically acceptable salt is from about 1:50 to about 1:0.5 on the basis of w/w. In one embodiment the ratio of acidifying agent used in comparison to carfilzomib or its pharmaceutically acceptable salt is from about 1:50 to about 1:1 on the basis of w/w. In one embodiment the ratio of acidifying agent used in comparison to carfilzomib or its pharmaceutically acceptable salt is from about 1:40 to about 1:1 on the basis of w/w. In one embodiment the ratio of acidifying agent used in comparison to carfilzomib or its pharmaceutically acceptable salt is from about 1:30 to about 1:1 on the basis of w/w. In one embodiment the ratio of acidifying agent used in comparison to carfilzomib or its pharmaceutically acceptable salt is from about 1:20 to about 1:1 on the basis of w/w. In one embodiment the ratio of acidifying agent used in comparison to carfilzomib or its pharmaceutically acceptable salt is from about 1:10 to about 1:1 on the basis of w/w.

In one embodiment, the component 2 is an acidifying agent present in the clear solution form at room temperature. In one embodiment, the solution of acidifying agent is optionally combined with solvent selected from alcohol, water, or mixture thereof. In one embodiment, the acidifying agent used is having ethanol and water in the ratio selected from 9:1 to 1:9. In one embodiment, the acidifying agent used is having ethanol and water in the ratio of 1:1.

In one embodiment, the component 2 has acidifying agent present in about 2% to 20% w/w before reconstitution with component 1. In embodiment the component 2 has acidifying agent present is selected from about 5% to 15% w/w or about 8% to 12% w/w before reconstitution with component 1.

In one embodiment of the present invention is provided a method of administering reconstituted ready to dilute solution comprising mixing of component 1 and component 2 to form reconstituted ready to dilute solution followed by diluting reconstituted ready to dilute solution with infusion media; wherein the component 1 comprises room temperature stable ready to dilute parenteral formulation of carfilzomib or its pharmaceutically acceptable salts and one or more solvent; and component 2 is acidifying agent.

In one embodiment of the present invention is provided a method of administering reconstituted ready to dilute solution comprising mixing of component 1 and component 2 to form reconstituted ready to dilute solution followed by diluting reconstituted ready to dilute solution with infusion media; wherein the component 1 comprises room temperature stable ready to dilute parenteral formulation of carfilzomib or its pharmaceutically acceptable salts and one or more solvent which contains no more than 6% of total impurities upon storage of six months when stored at 25° C. and 60% relative humidity; and component 2 is acidifying agent.

In one embodiment of the present invention is provided a method of administering reconstituted ready to dilute solution comprising mixing of component 1 and component 2 to form reconstituted ready to dilute solution followed by diluting reconstituted ready to dilute solution with infusion media; wherein the component 1 comprises room temperature stable ready to dilute parenteral formulation of carfilzomib or its pharmaceutically acceptable salts and one or more solvent which contains no more than 5% of total impurities upon storage of six months when stored at 25° C. and 60% relative humidity; and component 2 is acidifying agent.

In one embodiment of the present invention is provided a method of administering reconstituted ready to dilute solution comprising mixing of component 1 and component 2 to form reconstituted ready to dilute solution followed by diluting reconstituted ready to dilute solution with infusion media; wherein the component 1 comprises room temperature stable ready to dilute parenteral formulation of carfilzomib or its pharmaceutically acceptable salts and one or more solvent which contains no more than 4% of total impurities upon storage of six months when stored at 25° C. and 60% relative humidity; and component 2 is acidifying agent.

In one embodiment of the present invention is provided a method of administering reconstituted ready to dilute solution comprising mixing of component 1 and component 2 to form reconstituted ready to dilute solution followed by diluting reconstituted ready to dilute solution with infusion media; wherein the component 1 comprises room temperature stable ready to dilute parenteral formulation of Carfilzomib or its pharmaceutically acceptable salts and one or more solvent which contain no more than 3% of total impurities upon storage of six months when stored at 25° C. and 60% relative humidity; and component 2 is acidifying agent.

In one embodiment of the present invention is provided a method of administering reconstituted ready to dilute solution comprising mixing of component 1 and component 2 to form reconstituted ready to dilute solution followed by diluting reconstituted ready to dilute solution with infusion media; wherein the component 1 comprises room temperature stable ready to dilute parenteral formulation of carfilzomib or its pharmaceutically acceptable salts and one or more solvent which contains no more than 2% of total impurities upon storage of six months when stored at 25° C. and 60% relative humidity; and component 2 is acidifying agent.

In one embodiment of the present invention is provided a method of administering reconstituted ready to dilute solution comprising mixing of component 1 and component 2 to form reconstituted ready to dilute solution followed by diluting reconstituted ready to dilute solution with infusion media; wherein the component 1 comprises room temperature stable ready to dilute parenteral formulation of carfilzomib or its pharmaceutically acceptable salts and one or more solvent which contains no more than 1.5% of total impurities upon storage of six months when stored at 25° C. and 60% relative humidity; and component 2 is acidifying agent.

In one embodiment of the present invention is provided a method of administering reconstituted ready to dilute solution comprising mixing of component 1 and component 2 to form reconstituted ready to dilute solution followed by diluting reconstituted ready to dilute solution with infusion media; wherein the component 1 comprises room temperature stable ready to dilute parenteral formulation of carfilzomib or its pharmaceutically acceptable salts and one or more solvent which contains no more than 1% of total impurities upon storage of six months when stored at 25° C. and 60% relative humidity; and component 2 is acidifying agent.

In one embodiment of the present invention is provided a method of administering reconstituted ready to dilute solution comprising mixing of component 1 and component 2 to form reconstituted ready to dilute solution followed by diluting reconstituted ready to dilute solution with infusion media; wherein the component 1 comprises room temperature stable ready to dilute parenteral formulation of carfilzomib or its pharmaceutically acceptable salts and one or more solvent which contains no more than 0.5% of total impurities upon storage of six months when stored at 25° C. and 60% relative humidity; and component 2 is acidifying agent.

In one embodiment, the ready to dilute injectable composition of carfilzomib or its pharmaceutically acceptable slats does not contain more than total impurities selected from 0.9%, 0.8%, 0.7%, 0.6%, 0.4% or 0.3% upon storage of six months when stored at 25° C. and 60% relative humidity.

In one embodiment of the present invention provides room temperature stable ready to dilute injectable pharmaceutical composition comprising carfilzomib or its pharmaceutical acceptable salts thereof and at least one pharmaceutically acceptable excipient; wherein the said composition has the concentration of carfilzomib or its pharmaceutically acceptable salts about 60 mg/ml. In one embodiment of the present invention provides room temperature stable ready to dilute injectable pharmaceutical composition comprising carfilzomib or its pharmaceutical acceptable salts thereof and one or more solvent; wherein the said composition has the concentration of carfilzomib or its pharmaceutically acceptable salts about 60 mg/ml. In one embodiment of the present invention, component 1 has the concentration of carfilzomib or its pharmaceutically acceptable salts about 60 mg/ml.

In one embodiment of the present invention provides ready to dilute injectable pharmaceutical composition comprising carfilzomib or its pharmaceutical acceptable salts thereof and a solvent; wherein the composition has the concentration of about 60 mg/ml of carfilzomib or its pharmaceutically acceptable salts thereof and contains no more than 6% of total impurities upon storage of six months when stored at 25° C. and 60% relative humidity.

In one embodiment of the present invention provides ready to dilute injectable pharmaceutical composition comprising carfilzomib or its pharmaceutical acceptable salts thereof and a solvent; wherein the composition has the concentration of about 60 mg/ml of carfilzomib or its pharmaceutically acceptable salts thereof and contains no more than 5% of total impurities upon storage of six months when stored at 25° C. and 60% relative humidity.

In one embodiment of the present invention provides ready to dilute injectable pharmaceutical composition comprising carfilzomib or its pharmaceutical acceptable salts thereof and a solvent; wherein the composition has the concentration of about 60 mg/ml of carfilzomib or its pharmaceutically acceptable salts thereof and contains no more than 4% of total impurities upon storage of six months when stored at 25° C. and 60% relative humidity.

In one embodiment of the present invention provides ready to dilute injectable pharmaceutical composition comprising carfilzomib or its pharmaceutical acceptable salts thereof and a solvent; wherein the composition has the concentration of about 60 mg/ml of carfilzomib or its pharmaceutically acceptable salts thereof contains no more than 3% of total impurities upon storage of six months when stored at 25° C. and 60% relative humidity.

In one embodiment of the present invention provides ready to dilute injectable pharmaceutical composition comprising carfilzomib or its pharmaceutical acceptable salts thereof and a solvent; wherein the composition has the concentration of about 60 mg/ml of carfilzomib or its pharmaceutically acceptable salts thereof and contains no more than 2% of total impurities upon storage of six months when stored at 25° C. and 60% relative humidity.

In one embodiment of the present invention provides ready to dilute injectable pharmaceutical composition comprising carfilzomib or its pharmaceutical acceptable salts thereof and a solvent; wherein the composition has the concentration of about 60 mg/ml of carfilzomib or its pharmaceutically acceptable salts thereof and contains no more than 1.5% of total impurities upon storage of six months when stored at 25° C. and 60% relative humidity.

In one embodiment of the present invention provides ready to dilute injectable pharmaceutical composition comprising carfilzomib or its pharmaceutical acceptable salts thereof and a solvent; wherein the composition has the concentration of about 60 mg/ml of carfilzomib or its pharmaceutically acceptable salts thereof and contains no more than 1% of total impurities upon storage of six months when stored at 25° C. and 60% relative humidity.

In one embodiment of the present invention provides ready to dilute injectable pharmaceutical composition comprising carfilzomib or its pharmaceutical acceptable salts thereof and a solvent; wherein the composition has the concentration of about 60 mg/ml of carfilzomib or its pharmaceutically acceptable salts thereof and contains no more than 0.5% of total impurities upon storage of six months when stored at 25° C. and 60% relative humidity.

In one embodiment, the ready to dilute injectable composition of carfilzomib or its pharmaceutically acceptable slats does not contain more than total impurities selected from 0.9%, 0.8%, 0.7%, 0.6%, 0.4% or 0.3% upon storage of six months when stored at 25° C. and 60% relative humidity.

In one embodiment, a solvent in the ready to dilute injectable composition is N,N-dimethyl acetamide.

In one embodiment, the present invention provides a method for treating patients with relapsed or refractory multiple myeloma which includes method of administering ready to dilute injectable pharmaceutical composition comprising carfilzomib or its pharmaceutical acceptable salts thereof and a solvent; wherein the composition has the concentration of about 60 mg/ml of carfilzomib or its pharmaceutically acceptable salts thereof and contains no more than 0.5% of total impurities upon storage of six months when stored at 25° C. and 60% relative humidity.

In one embodiment, a method for treating patients with relapsed or refractory multiple myeloma which includes method of administering the ready to dilute injectable composition of carfilzomib or its pharmaceutically acceptable slats does not contain more than total impurities selected from 0.9%, 0.8%, 0.7%, 0.6%, 0.5%, 0.4% or 0.3% upon storage of six months when stored at 25° C. and 60% relative humidity.

In one embodiment, a solvent in the component 1 having ready to dilute injectable composition is N,N-dimethyl acetamide.

In one embodiment of the present invention provides an injectable kit having component 1 and component 2, wherein component 1 comprises carfilzomib or its pharmaceutical acceptable salts thereof and a solvent having the concentration of about 60 mg/ml of carfilzomib or its pharmaceutically acceptable salts thereof and contains no more than 6% of total impurities upon storage of six months when stored at 25° C. and 60% relative humidity; and wherein component 2 is solution of acidifying agent having a pH of about 1 to about 2. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% upon storage of six months when stored at 25° C. and 60% relative humidity.

In one embodiment of the present invention an injectable kit having component 1 and component 2, wherein the component 1 comprises carfilzomib or its pharmaceutical acceptable salts thereof, one or more solvent and optionally one or more pharmaceutically acceptable excipients selected from antioxidant, buffer, preservative and surfactant, wherein the concentration of carfilzomib or its pharmaceutically acceptable salts thereof in the component 1 is about 60 mg/ml and contains no more than 6% of total impurities upon storage of six months when stored at 25° C. and 60% relative humidity; and the component 2 is solution of acidifying agent having pH of about 1 to about 2.

In one embodiment component 2 is an acidifying agent present in the clear solution form at room temperature. In one embodiment, the solution of acidifying agent is optionally combined with solvent selected from alcohol, water or mixture thereof. In one embodiment, the acidifying agent used is having ethanol and water in the ratio selected from 9:1 to 1:9. In one embodiment, the acidifying agent used is having ethanol and water in the ratio of 1:1.

In one embodiment, the present invention provides an injectable kit having component 1 and component 2 packed in separate sterile container. In one embodiment the injectable kit supplies component 1 and component 2 together in a package to a person in need thereof. In one embodiment, the injectable kit separately supplies the component 1 and component 2 under different packages is also under the scope of the present invention.

In one embodiment, the present invention provides an injectable kit having component 1 and component 2 wherein, component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of about 1 to about 2; wherein mixing of component 1 and component 2 gives reconstituted ready to dilute solution comprising carfilzomib or its pharmaceutically acceptable salts at the concentration of about 40 mg/ml. In one embodiment, component 1 contains not more than total impurities selected from group consisting of 5%, 4%, 3%, 2%, 1.5%, 1%, 0.9%, 0.8%, 0.7%, 0.6%, 0.5% or 0.4% upon storage of six months when stored at 25° C. and 60% relative humidity.

In one embodiment, the present invention provides an injectable kit having component 1 and component 2 wherein, component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of about 1 to about 2 and water content is about 20% V/V to 60% V/V. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% upon storage of six months when stored at 25° C. and 60% relative humidity In one embodiment, the present invention provides an injectable kit having component 1 and component 2 wherein, component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of about 1 to about 2; wherein mixing of component 1 and component 2 yields reconstituted ready to dilute solution comprising carfilzomib or its pharmaceutically acceptable salts at the concentration of 40 mg/ml having water content not less than 10%. In one embodiment, the water content of the reconstituted ready to dilute injectable composition after mixing component 1 and component 2 is selected from group consisting of not less than 10%, 15%, 20%, 25%. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% upon storage of six months when stored at 25° C. and 60% relative humidity.

In one embodiment, the present invention provides an injectable kit having component 1 and component 2 wherein, the component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at 25° C. and 60% relative humidity; and the component 2 is solution of acidifying agent having a pH of 1 to 2; wherein mixing of component 1 and component 2 yields reconstituted ready to dilute solution comprising carfilzomib or its pharmaceutically acceptable salts at a concentration of about 40 mg/ml which is further diluted with infusion media having not more than 10% hemolytic potential.

In one embodiment, the present invention provides a method for treating patients with relapsed or refractory multiple myeloma comprises providing an injectable kit having component 1 and component 2 wherein, component 1 comprises carfilzomib or its pharmaceutically acceptable salts and a solvent having the concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of about 1 to about 2; wherein method comprises mixing of component 1 and component 2 to obtain reconstituted ready to dilute solution comprising carfilzomib or its pharmaceutically acceptable salts at a concentration of 40 mg/ml having water content not less than 10%. In one embodiment, the water content of the reconstituted ready to dilute injectable composition after mixing component 1 and component 2 is selected from group consisting of not less than 10%, 15%, 20%, 25%. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% upon storage of six months when stored at 25° C. and 60% relative humidity.

In one embodiment, the present invention provides an injectable kit having component 1 and component 2 wherein, component 1 comprises carfilzomib or its pharmaceutically acceptable salts and a solvent having the concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of about 1 to about 2; wherein mixing of component 1 and component 2 yields reconstituted ready to dilute solution comprising carfilzomib or its pharmaceutically acceptable salts at a concentration of 40 mg/ml and wherein the reconstituted ready to dilute injectable composition provides a dose of about 15 mg to about 200 mg of carfilzomib or its pharmaceutically acceptable salts in a single step dilution with final infusion media for administering desired concentration to patient. In one embodiment, the reconstituted ready to dilute injectable composition provides a dose of about 15 mg to about 160 mg of carfilzomib in a single step dilution with final infusion media for administering desired concentration to patient. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% upon storage of six months when stored at 25° C. and 60% relative humidity.

In one embodiment, the present invention provides a method for treating patients with relapsed or refractory multiple myeloma comprises providing an injectable kit having component 1 and component 2 wherein, component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of 1 to 2; wherein method comprises mixing of component 1 and component 2 to obtain reconstituted ready to dilute solution comprising carfilzomib or its pharmaceutically acceptable salts at the concentration of 40 mg/ml and wherein the reconstituted ready to dilute injectable composition provides a dose of about 15 mg to about 200 mg of carfilzomib or its pharmaceutically acceptable salts in a single step dilution with final infusion media for administering to patient. In one embodiment, the reconstituted ready to dilute injectable composition provides a dose of about 15 mg to about 160 mg of carfilzomib in a single step dilution with final infusion media for administering to patient. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% s upon storage of six months when stored at 25° C. and 60% relative humidity.

In one embodiment, the present invention provides an injectable composition comprising component 1 and component 2 wherein, component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of about 1 to about 2; wherein mixing of component 1 and component 2 gives reconstituted ready to dilute solution comprising carfilzomib or its pharmaceutically acceptable salts at the concentration of about 40 mg/ml. In one embodiment, component 1 contains not more than total impurities selected from group consisting of 5%, 4%, 3%, 2%, 1.5%, 1%, 0.9%, 0.8%, 0.7%, 0.6%, 0.5% or 0.4% upon storage of six months when stored at 25° C. and 60% relative humidity.

In one embodiment, the present invention provides injectable composition comprising component 1 and component 2 wherein, component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of about 1 to about 2 and water content is about 20% V/V to 60% V/V. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% upon storage of six months when stored at 25° C. and 60% relative humidity In one embodiment, the present invention provides injectable composition comprising component 1 and component 2 wherein, component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of about 1 to about 2; wherein mixing of component 1 and component 2 yields reconstituted ready to dilute solution comprising carfilzomib or its pharmaceutically acceptable salts at the concentration of 40 mg/ml having water content not less than 10%. In one embodiment, the water content of the reconstituted ready to dilute injectable composition after mixing component 1 and component 2 is selected from group consisting of not less than 10%, 15%, 20%, 25%. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% upon storage of six months when stored at 25° C. and 60% relative humidity.

In one embodiment, the present invention provides a method for treating patients with relapsed or refractory multiple myeloma comprises providing an injectable composition having component 1 and component 2 wherein, component 1 comprises carfilzomib or its pharmaceutically acceptable salts and a solvent having the concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of about 1 to about 2; wherein method comprises mixing of component 1 and component 2 to obtain reconstituted ready to dilute solution comprising carfilzomib or its pharmaceutically acceptable salts at a concentration of 40 mg/ml having water content not less than 10%. In one embodiment, the water content of the reconstituted ready to dilute injectable composition after mixing component 1 and component 2 is selected from group consisting of not less than 10%, 15%, 20%, 25%. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% upon storage of six months when stored at 25° C. and 60% relative humidity.

In one embodiment, the present invention provides an injectable composition comprising component 1 and component 2 wherein, component 1 comprises carfilzomib or its pharmaceutically acceptable salts and a solvent having the concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of about 1 to about 2; wherein mixing of component 1 and component 2 yields reconstituted ready to dilute solution comprising carfilzomib or its pharmaceutically acceptable salts at a concentration of 40 mg/ml and wherein the reconstituted ready to dilute injectable composition provides a dose of about 15 mg to about 200 mg of carfilzomib or its pharmaceutically acceptable salts in a single step dilution with final infusion media for administering desired concentration to patient. In one embodiment, the reconstituted ready to dilute injectable composition provides a dose of about 15 mg to about 160 mg of carfilzomib in a single step dilution with final infusion media for administering desired concentration to patient. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% upon storage of six months when stored at 25° C. and 60% relative humidity.

In one embodiment, the present invention provides a method for treating patients with relapsed or refractory multiple myeloma comprises providing an injectable kit having component 1 and component 2; wherein component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at 25° C. and 60% relative humidity; and component 2 is solution of acidifying agent having a pH of 1 to 2; wherein method comprises mixing of component 1 and component 2 to obtain reconstituted ready to dilute solution comprising carfilzomib or its pharmaceutically acceptable salts at a concentration of about 40 mg/ml which is further diluted with infusion media having not more than 10% hemolytic potential.

In one embodiment, the present invention provides a method for treating patients with relapsed or refractory multiple myeloma comprises providing an injectable composition having component 1 and component 2 wherein, component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at room temperature and 60% RH; and component 2 is solution of acidifying agent having a pH of 1 to 2; wherein method comprises mixing of component 1 and component 2 to obtain reconstituted ready to dilute solution comprising carfilzomib or its pharmaceutically acceptable salts at the concentration of 40 mg/ml and wherein the reconstituted ready to dilute injectable composition provides a dose of about 15 mg to about 200 mg of carfilzomib or its pharmaceutically acceptable salts in a single step dilution with final infusion media for administering to patient. In one embodiment, the reconstituted ready to dilute injectable composition provides a dose of about 15 mg to about 160 mg of carfilzomib in a single step dilution with final infusion media for administering to patient. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% s upon storage of six months when stored at 25° C. and 60% relative humidity.

In one embodiment, the hemolytic potential of infusion media administered to patient after dilution with reconstituted ready to dilute composition is selected from group consisting of not more than 9%, 8%, 7%, 6%, 5%, 4%, 3%, 2% or 1%.

In one embodiment, the present invention provides an injectable kit having component 1 and component 2 wherein, component 1 comprises carfilzomib or its pharmaceutically acceptable salts and a solvent having the concentration of about 60 mg/ml of carfilzomib or its pharmaceutically acceptable salts thereof and is not having more than 6% of impurity during the six month of storage period when stored at 25° C. and 60% relative humidity; and component 2 is solution of acidifying agent having a pH of about 1 to about 2; wherein mixing of component 1 and component 2 yields reconstituted ready to dilute solution comprising carfilzomib or its pharmaceutically acceptable salts at the concentration of about 40 mg/ml which upon required dilution with infusion media does not have hemolytic potential more than 10%. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% upon storage of six months when stored at 25° C. and 60% relative humidity.

In one embodiment, the present invention provides a method for treating patients with relapsed or refractory multiple myeloma comprises providing an injectable kit having component 1 and component 2; wherein component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at 25° C. and 60% relative humidity; and component 2 is solution of acidifying agent having a pH of about 1 to about 2; wherein method comprises mixing of component 1 and component 2 to obtain reconstituted ready to dilute solution comprising carfilzomib or its pharmaceutically acceptable salts at the concentration of about 40 mg/ml which upon required dilution with infusion media does not have hemolytic potential more than 10%. In one embodiment, component 1 contains not more than total impurities selected from group consisting of 5%, 4%, 3%, 2%, 1.5%, 1%, 0.9%, 0.8%, 0.7%, 0.6%, 0.5% or 0.4 upon storage of six months when stored at 25° C. and 60% relative humidity.

In one embodiment, the present invention provides an injectable composition comprising component 1 and component 2 wherein, component 1 comprises carfilzomib or its pharmaceutically acceptable salts and a solvent having the concentration of about 60 mg/ml of carfilzomib or its pharmaceutically acceptable salts thereof and is not having more than 6% of impurity during the six month of storage period when stored at 25° C. and 60% relative humidity; and component 2 is solution of acidifying agent having a pH of about 1 to about 2; wherein mixing of component 1 and component 2 yields reconstituted ready to dilute solution comprising carfilzomib or its pharmaceutically acceptable salts at the concentration of about 40 mg/ml which upon required dilution with infusion media does not have hemolytic potential more than 10%. In one embodiment, component 1 contains not more than total impurities selected from group consisting of 5%, 4%, 3%, 2%, 1.5%, 1%, 0.9%, 0.8%, 0.7%, 0.6%, 0.5%, 0.4% or 0.3% upon storage of six months when stored at 25° C. and 60% relative humidity.

In one embodiment, the present invention provides a method for treating patients with relapsed or refractory multiple myeloma comprises providing an injectable composition having component 1 and component 2; wherein component 1 comprises carfilzomib or its pharmaceutically acceptable salts and a solvent having concentration of about 60 mg/ml of carfilzomib or its pharmaceutically acceptable salts thereof and is not having more than 6% of impurity during the six month of storage period when stored at 25° C. and 60% relative humidity; and component 2 is solution of acidifying agent having a pH of about 1 to about 2; wherein method comprises mixing of component 1 and component 2 to obtain reconstituted ready to dilute solution comprising carfilzomib or its pharmaceutically acceptable salts at the concentration of about 40 mg/ml which upon required dilution with infusion media does not have hemolytic potential more than 10%. In one embodiment, component 1 contains not more than total impurities selected from group consisting of 5%, 4%, 3%, 2%, 1.5%, 1%, 0.9%, 0.8%, 0.7%, 0.6%, 0.5% or 0.4 upon storage of six months when stored at 25° C. and 60% relative humidity.

In one embodiment, the required dilution of reconstituted ready to dilute solution comprises diluting a desired volume into infusion media. In one embodiment selected volume of reconstituted ready to dilute injectable solution with infusion media is selected from 0.5 ml, 1 ml, 1.25 ml, 1.5 ml, 2 ml, 2.5 ml, 3 ml, 3.5 ml, 4 ml. In one embodiment volume of infusion media used to mix with selected volume of reconstituted ready to dilute is selected from about 50 ml to about 100 ml. In one embodiment volume of infusion media used to mix with selected volume of reconstituted ready to dilute is selected from 50 ml, 75 ml or 100 ml. In one embodiment, the infusion media is selected from saline injection, sterile water for injection or dextrose injection. In proffered embodiment, the infusion media is 5% dextrose injection.

In one embodiment, the present invention provides the method of administering the accurate dose of carfilzomib or its pharmaceutically acceptable salts thereof when a fixed volume of the reconstituted ready to dilute composition is mixed with 5% dextrose injection before delivering the infusion to patient. In one embodiment, 0.5 ml of reconstituted ready dilute composition when mixed with 50 ml to 100 ml of 5% dextrose is capable to deliver 20 mg of carfilzomib or pharmaceutically acceptable salts thereof in patient.

In one embodiment, 1 ml of reconstituted ready dilute composition when mixed with 50 ml to 100 ml of 5% dextrose is capable to deliver 40 mg of carfilzomib or pharmaceutically acceptable salts thereof in patient.

In one embodiment, 2 ml of reconstituted ready dilute composition when mixed with 50 ml to 100 ml of 5% dextrose is capable to deliver 80 mg of carfilzomib or pharmaceutically acceptable salts thereof in patient.

In one embodiment, 3 ml of reconstituted ready dilute composition when mixed with 50 ml to 100 ml of 5% dextrose is capable to deliver 120 mg of carfilzomib or pharmaceutically acceptable salts thereof in patient.

In one embodiment, 3.85 ml of reconstituted ready dilute composition when mixed with 50 ml to 100 ml of 5% dextrose is capable to deliver 154 mg of carfilzomib or pharmaceutically acceptable salts thereof in patient.

In one embodiment, 4 ml of reconstituted ready dilute composition when mixed with 50 ml to 100 ml of 5% dextrose is capable to deliver 160 mg of carfilzomib or pharmaceutically acceptable salts thereof in patient.

In one embodiment, about 0.5 ml to about 4 ml reconstituted ready dilute composition when mixed with 50 ml to 100 ml of 5% dextrose is capable to deliver about 20 mg to about 160 mg of carfilzomib or pharmaceutically acceptable salts thereof in patient.

In one embodiment, the pH of final infusion media after mixing desired volume of reconstituted ready to dilute is about 2 to about 3.5. Preferably the pH is about 2 to about 3.

In one embodiment, the osmolality of final infusion obtained after mixing desired volume of reconstituted ready to dilute solution is about 0.400 to about 0.800 Osmol/kg.

In one embodiment, the osmolality of final infusion obtained after mixing desired volume of reconstituted ready to dilute solution is about 0.400 to about 1 Osmol/kg.

The following examples are given for the purpose of illustrating the present invention and should not be considered as limiting the scope of the invention.

Example 1: Composition of Carfilzomib with 6 Months Stability Data

| APPL-006/01/105 | | |
| --- | --- | --- |
| Ingredients | Grade | Qty/mL |
| Vial - 1 (Component 1) | | |
| Carfilzomib | US-DMF | 60 mg |
| N-N Dimethyl acetamide | USP-NF | q.s. to 1 ml (≈940 mg) |
| Vial - 2 (Component 2) | | |
| O-Phosphoric acid | USP/NF | 90 µL |
| Dehydrated ethanol | USP/NF | 50% v/v (394.5 mg) |
| Water for Injection | USP/NF | q.s. to 1 ml |

Procedure:
Vial 1:
1. Added weighed batch quantity of Carfilzomib under continuous stirring in 80% N,N-dimethyl acetamide until uniform solution obtained
2. Final volume made-up by N, N-Dimethylacetamide and stirred until uniform solution obtained.
3. Filtered through 0.22µ PTFE filter.

Vial 2:
1. Weighed batch quantity of Ortho-Phosphoric acid was added to weighed batch quantity of dehydrated alcohol.
2. Final volume was made up by Water for Injection.

Reconstituted Ready to Dilute Solution Product:

0.5 mL was withdraw from vial 2 (OPA 90 µL+Dehydrated alcohol 0.5 mL+WFI q.s. to 1 mL) and mixed with vial 1 (Carfilzomib 60 mg+N,N-Dimethyl acetamide q.s. to 1 mL). It gave 40 mg/mL drug product.

TABLE 1

Stability data of ready to dilute composition (Component 1) at specified storage condition for 6 months

| Batch No. | Time points | Description Clear colorless solution | Between 95.0% to 105.0% Assay | Related Substances | | | | | | | |
|---|---|---|---|---|---|---|---|---|---|---|---|
| | | | | Acid Impurity NMT 0.2% | Phenol Impurity NMT 0.2% | Chloro Impurity NMT 0.5% | Diol Impurity NMT 0.5% | Diastereomer NMT 0.2% | N-Oxide Impurity NMT 1.0% | Any other individual NMT 0.2% | Total Impurities NMT 3.0% |
| APPL-006/01/105 | Initial | Clear solution | 101.2 | ND | ND | ND | ND | ND | ND | 0.04 | 0.07 |
| | 40/75 1 M | Clear solution | 100.5 | ND | ND | 0.02 | ND | ND | 0.06 | 0.15 | 0.38 |
| | 40/75 3 M | Clear solution | 102.5 | ND | ND | ND | ND | ND | 0.11 | 0.11 | 0.36 |
| | 40/75 6 M | Clear solution | 99.2 | ND | ND | 0.22 | ND | ND | 0.40 | 0.42 | 1.05 |
| | 25/60 3 M | Clear solution | 101.4 | ND | ND | ND | ND | ND | ND | 0.05 | 0.11 |
| | 25/60 6 M | Clear solution | 100.9 | ND | ND | 0.07 | ND | ND | 0.06 | 0.08 | 0.22 |
| | 5 ± 3° C. 6 M | Clear solution | 102.2 | ND | ND | 0.05 | ND | ND | ND | 0.07 | 0.11 |

*ND = Not detected, 1 M = 1 month, 3 M = 3 months, 6 M = 6 months, 40/75 = 40° C. at 75% RH, 25/60 = 25° C. at 60% RH For delivering the dose range of 15 mg to 154 mg use the 50 or 100 ml of infusion medium, to achieve the final concentration range of 0.5 to 1.54 mg/ml.

Example 2 Component 2 Optimization Trials

TABLE 2

| | Carfilzomib preparation | |
|---|---|---|
| Ingredients | APPL-006/01/102 Qty mg/mL | APPL-006/01/105 Qty mg/mL |
| Carfilzomib | 60 | 60 |
| DMA | q.s. to 1 mL | q.s. to 1 mL |

Procedure: APPL-006/01/102
1. Added weighed batch quantity of Carfilzomib under continuous stirring in 80% N,N-dimethyl acetamide until uniform solution obtained
2. Final volume made-up by N, N-Dimethylacetamide and stirred until uniform solution obtained.
3. Filtered through 0.22μ PTFE filter Procedure: APPL-006/01/105
1. Added weighed batch quantity of Carfilzomib under continuous stirring in 80% N,N-dimethyl acetamide until uniform solution obtained
2. Final volume made-up by N,N-Dimethylacetamide and stirred until uniform solution obtained.
3. Filtered through 0.22μ PTFE filter Procedure for Dilution (Vial-1 and Vial-2) and 2 mg/mL Dilution with Water for Injection of APPL-006/01/102
Vial-1: APPL-006/01/105 (100% N, N DMA and 60 mg/mL carfilzomib)
Vial-2(A): 150 μL Ortho Phosphoric acid up to 1 mL Water for injection
Vial-2(B): 60 μL Ortho Phosphoric acid in 50:50 of Ethanol & Water for injection
Vial-2(C): 90 μL Ortho Phosphoric acid in 50:50 of Ethanol & Water for injection
Vial-2(D): 120 μL Ortho Phosphoric acid in 50:50 of Ethanol & Water for injection
Vial-2 (E): 180 μL Ortho Phosphoric acid up to 1 mL Water for injection
Vial-2(F): 300 μL Ortho Phosphoric acid up to 1 mL Water for injection
Vial-2(G): 90 μL Ortho Phosphoric acid up to 1 mL Ethanol

TABLE 3

Procedure for dilution (Vial-1 and Vial-2) and 2 mg/mL dilution with Water for Injection of APPL-006/01/102

| Sr. No | Batch No. | Batch Detail (Vial-1 + vial-2) | Description | 2 mg/mL dilution with WFI | Description |
|---|---|---|---|---|---|
| 1 | APPL-006/01/102A | 0.1 mL of Vial-1 + 0.05 mL of vial-2(A) | Clear solution | 0.15 mL product from each batch and volume upto 3 mL with WFI | Slight hazy solution |
| 2 | APPL-006/01/102B | 0.1 mL of Vial-1 + 0.05 mL of vial-2(B) | Clear solution | | Slight hazy solution |
| 3 | APPL-006/01/102C | 0.1 mL of Vial-1 + 0.05 mL of vial-2(C) | Clear solution | | Clear solution |
| 4 | APPL-006/01/102D | 0.1 mL of Vial-1 + 0.05 mL of vial-2(D) | Clear solution | | Clear solution |
| 5 | APPL-006/01/102E | 0.1 mL of Vial-1 + 0.05 mL of vial-2(E) | Clear solution | | Clear solution |
| 6 | APPL-006/01/102F | 0.1 mL of Vial-1 + 0.05 mL of vial-2(F) | Clear solution | | Clear solution |

TABLE 3-continued

Procedure for dilution (Vial-1 and Vial-2) and 2 mg/mL dilution with Water for Injection of APPL-006/01/102

| Sr. No | Batch No. | Batch Detail (Vial-1 + vial-2) | Description | 2 mg/mL dilution with WFI | Description |
|---|---|---|---|---|---|
| 7 | APPL-006/01/102G | 0.1 mL of Vial-1 + 0.05 mL of vial-2(G) | Clear solution | | Very Slight hazy solution |

➤ Procedure for Dilution (Vial-1 and Vial-2) and 2 mg/mL, 0.27 mg/mL, 0.8 mg/mL and 0.6 Mg/mL Dilution with Water for Injection of APPL-006/01/105B, APPL-006/01/105C and APPL-006/01/105D Vial-1: APPL-006/01/105 (100% N, N DMA and 60 mg/mL carfilzomib)

Vial-2(A): 60 µL Ortho Phosphoric acid up to 50:50 of ethanol and Water for Injection Vial-2(B): 90 µL Ortho Phosphoric acid up to 1 mL by 50:50 of ethanol and Water for Injection Vial-2(C): 60 µL Ortho Phosphoric acid up to 1 mL by ethanol

TABLE 4

Procedure for dilution (Vial-1 and Vial-2) and 2 mg/mL, 0.27 mg/mL, 0.6 mg/mL, 0.8 mg/mL and 1.54 mg/mL dilution with WFI

| | | | Step 1: Drug product with Acid solution | | Step 2: Dilute step 1 with WFI | |
|---|---|---|---|---|---|---|
| Sr. No | Batch No. | Batch Detail (Vial-1 + vial-2) | Description | mg/mL | Dilution with WFI | Description |
| 1 | APPL-006/01/105B | 0.1 mL of Vial-1 + 0.1 mL of vial-2(A) | Clear solution | For 2 mg/mL | Volume upto 3 mL | Slight hazy solution |
| | | 0.1 mL of Vial-1 + 0.1 mL of vial-2(A) | | For 0.27 mg/mL | Volume upto 22 mL | Slight hazy solution |
| | | 0.1 mL of Vial-1 + 0.1 mL of vial-2(A) | | For 0.6 mg/mL | Volume upto 10 mL | Clear solution |
| | | 0.1 mL of Vial-1 + 0.1 mL of vial-2(A) | | For 0.8 mg/mL | Volume upto 7.4 mL | Clear solution |
| | | 0.1 mL of Vial-1 + 0.1 mL of vial-2(A) | | For 1.54 mg/mL | Volume up to 3.9 mL | Clear solution |
| 2 | APPL-006/01/105C | 0.1 mL of Vial-1 + 0.05 mL of vial-2(B) | Clear solution | For 2 mg/mL | Volume upto 3 mL | Very Slight hazy solution |
| | | 0.1 mL of Vial-1 + 0.05 mL of vial-2(B) | | For 0.27 mg/mL | Volume upto 22 mL | Very slight hazy solution |
| | | 0.1 mL of Vial-1 + 0.05 mL of vial-2(B) | | For 0.6 mg/mL | Volume upto 10 mL | Clear solution |
| | | 0.1 mL of Vial-1 + 0.05 mL of vial-2(B) | | For 0.8 mg/mL | Volume upto 7.4 mL | Clear solution |
| | | 0.1 mL of Vial-1 + 0.05 mL of vial-2(B) | | For 0.5 mg/mL | Volume upto 12 mL | Clear solution |
| | | 0.1 mL of Vial-1 + 0.05 mL of vial-2(B) | | For 1.0 mg/mL | Volume upto 6 mL | Clear solution |
| | | 0.1 mL of Vial-1 + 0.05 mL of vial-2(B) | | For 1.54 mg/mL | Volume upto 3.9 mL | Clear solution |
| 3 | APPL-006/01/105D | 0.1 mL of Vial-1 + 0.05 mL of vial-2(C) | Clear solution | For 2 mg/mL | Volume up to 3 mL | clear solution |
| | | 0.1 mL of Vial-1 + 0.05 mL of vial-2(C) | | For 0.27 mg/mL | Volume up to 22 mL | clear solution |
| | | 0.1 mL of Vial-1 + 0.05 mL of vial-2(C) | | For 0.6 mg/mL | Volume up to 10 mL | Clear solution |
| | | 0.1 mL of Vial-1 + 0.05 mL of vial-2(C) | | For 0.8 mg/mL | Volume up to 7.4 mL | Clear solution |

TABLE 4-continued

Procedure for dilution (Vial-1 and Vial-2) and 2 mg/mL, 0.27 mg/mL, 0.6 mg/mL, 0.8 mg/mL and 1.54 mg/mL dilution with WFI

| | | Step1: Drug product with Acid solution | | | Step 2: Dilute step 1 with WFI | |
|---|---|---|---|---|---|---|
| Sr. No | Batch No. | Batch Detail (Vial-1 + vial-2) | Description | mg/mL | Dilution with WFI | Description |
| | | 0.1 mL of Vial-1 + 0.05 mL of vial-2(C) | | For 1.54 mg/mL | Volume up to 3.9 mL | Clear solution |

Example 3: Hemolytic Potential of Carfilzomib Composition after Mixing Reconstituted Ready to Dilute with Infusion Media Method
Blank, Negative and Positive Control
  Blank: Diluted Blood
  Negative control (Vehicle): 0.9% Sodium chloride (Normal Saline) is isotonic with Human blood.
  Positive control: 5% Saponin was used as positive control
Test System Preparation
  Required quantity of blood was collected into $K_2$ EDTA vials and immediately mixed well, this was used for the study within 24 hours of blood collection. The blood was maintained at ambient room temperature before use.
  Hemoglobin was determined using Advia 2120i heamtology system for this purpose, concentrations will be determined twice, before and after dilution.
  A separate aliquot of blood was centrifuged, and plasma was analyzed for hemoglobin to ensure blood was not hemolyzed before the study.
Linearity of Hemoglobin
  Hemoglobin standard solutions was prepared using human hemoglobin. Initially, a stock solution of 180 mg hemoglobin/mL was prepared in Drabkin's reagent by dissolving the hemoglobin powder in Drabkin's reagent. The working standards of at least 6 different concentrations was prepared in Drabkin's reagent and was read in plate reader at 540 nm wavelength.
Test formulation Preparation
  1) Vial-1: Carfilzomib 60 mg+N, N DMA
  2) Vial-2: 90 µL OPA+(50:50 ratio Ethanol:WFI)
  Mixed 1 mL from vial 1 and 0.5 mL from vial 2 to obtain 40 mg/mL of carfilzomib injection.
Preparation of Test Item and Test Item Placebo:
  Step-1: 0.8 mL from vial-1 (Active vial) was added to 0.4 mL from vial-2 (Diluent) to make 1.2 mL of 40 mg/mL
    Procedure for 1.54 mg/mL: 0.193 mL from step-1 was made up to 5.0 mL with 5% dextrose
    Procedure for 1.0 mg/mL: 0.125 mL from step-1 was made up to 5.0 mL with 5% dextrose
    Procedure for 0.5 mg/mL: 0.063 mL from step-1 was made up to 5.0 mL with 5% dextrose
Preparation of the KYPROLIS® Product:
Vial 1: Kyprolis (Carfilzomib for Injection) 30 mg/mL
  1. Aseptically reconstituted the Kyprolis vial only with Sterile Water for Injection, USP using 15 ml volumes. Used a 21-gauge or larger needle to reconstitute each vial by slowly injecting sterile water for injection, USP through the stopper and directed the sterile water for injection, USP onto the inside wall of the vial to minimize foaming.
  2. Gently mixed the vial slowly until complete dissolution was obtained.
  3. Visually inspected for particulate matter and discoloration prior to administration.
  4. After reconstitution it was 30 mg/Vial or 2 mg/mL and from that 1 mL was be used directly in assay.
Assay Procedure
  Triplicate tubes containing 1000 µL of the diluted blood was taken and incubated for 10 & 30 min at 37° C.±2° C. These was considered as blank.
  Triplicate tubes containing 500 µL of negative controls (Normal Saline) was taken in individual polypropylene vials and 500 µL of diluted blood was added to each vial and incubated for 10 & 30 min at 37° C.±2° C. (1:1 ratio).
  Triplicate tubes containing 500 µL of positive controls was taken in individual polypropylene vials and 500 µL of diluted blood was added to each vial and incubated for 10 & 30 min at 37° C.±2° C. (1:1 ratio).
  Triplicate tubes containing 500 µL of test item and test item. Placebo (1.54, 1.0, 0.5 mg/mL) was taken in individual polypropylene vials and 500 µL of diluted blood was added to each vial and incubated for 10 & 30 min at 37° C.±2° C. (1:1 ratio).
  Triplicate tubes containing 500 µL of reference item (2 mg/mL) was taken in individual polypropylene vials and 500 µL of diluted blood was added to each vial and incubated for 10 & 30 min at 37° C.±2° C. (1:1 ratio).
  After the incubation all the vials was centrifuged at 3000 rpm at 15±5° C. for 5-10 minutes and the supernatant plasma was collected.
  After Centrifugation 0.1 mL of supernatant plasma from each of the above samples was mixed with 1.0 mL of Drabkin's reagent and incubated for 15 minutes at ambient room temperature.
  After the incubation period about 250 µL of above mixture was transferred to microplate and Optical density of the all the sample was read using microplate reader at 540 nm.
  Note: Incubation time may be variable ±2 minutes from the stipulated time.
  The results were interpreted as stated below:
  Hemolysis value of ≤10%: Non hemolytic; Hemolysis value of 10-15%: Moderate hemolysis; Hemolysis value of ≥25%: Risk for hemolysis

TABLE 5

% Hemolysis observed in test and reference samples

| Description | 10 min of Incubation % Hemolysis | 30 min of Incubation % Hemolysis |
|---|---|---|
| Blank | 0 | 0 |
| Negative control | 0.63 | 0.63 |
| Positive control | 100.00 | 100.00 |
| Test - 1.54 mg/mL | 1.40 | 1.84 |

TABLE 5-continued

% Hemolysis observed in test and reference samples

| Description | 10 min of Incubation % Hemolysis | 30 min of Incubation % Hemolysis |
|---|---|---|
| Test - 1.0 mg/mL | 0.91 | 0.76 |
| Test - 0.5 mg/mL | 0.73 | 0.45 |
| Placebo - 1.54 mg/mL | 1.12 | 1.39 |
| Placebo - 1.0 mg/mL | 0.80 | 1.04 |
| Placebo - 0.5 mg/mL | 0.66 | 0.63 |
| KYPROLIS ® | 0.59 | 0.42 |

TABLE 6

Osmolality and pH of infusion media after mixing test and reference sample

| Description | Osmolality Osmol/kg | pH |
|---|---|---|
| Normal Saline | 0.282 | 6.9 |
| KYPROLIS ® | 0.295 | 3.59 |
| Test - 1.54 mg/mL | 0.707 | 2.31 |
| Test - 1.0 mg/mL | 0.580 | 2.42 |
| Test - 0.5 mg/mL | 0.435 | 2.62 |
| Placebo - 1.54 mg/mL | 0.742 | 2.29 |
| Placebo - 1.0 mg/mL | 0.584 | 2.48 |
| Placebo - 0.5 mg/mL | 0.444 | 2.65 |
| Positive Control | 0.165 | 5.24 |

We claim:

1. An injectable kit having component 1 and component 2, wherein the component 1 comprises carfilzomib or its pharmaceutical acceptable salts thereof, one or more solvent and optionally one or more pharmaceutically acceptable excipients selected from antioxidant, buffer, preservative and surfactant, wherein the concentration of carfilzomib or its pharmaceutically acceptable salts thereof in the component 1 is about 60 mg/ml and contains no more than 3% of total impurities upon storage of six months when stored at 25° C. and 60% relative humidity; and the component 2 is solution of acidifying agent having pH of about 1 to about 2.

2. The injectable kit according to claim 1, wherein component 2 is having ethanol and water in the ratio selected from 9:1 to 1:9.

3. The injectable kit according to claim 2, wherein component 2 has water content of about 20% v/v to 60% v/v.

4. The injectable kit according to claim 1, wherein the component 1 does not contain more than total impurities selected from group consisting of 2%, 1.5%, 1%, 0.9%, 0.8%, 0.7%, 0.6%, 0.5%, 0.4% or 0.3% upon storage of six months when stored at 25° C. and 60% relative humidity.

5. An injectable kit having component 1 and component 2 wherein:
   (a) the component 1 comprises carfilzomib or its pharmaceutically acceptable salts and a solvent having concentration of about 60 mg/ml of carfilzomib or its pharmaceutically acceptable salts thereof and is not having more than 3% of impurity during the six month of storage period when stored at room temperature and 60% RH; and the component 2 is solution of acidifying agent having a pH of about 1 to about 2; wherein mixing of the component 1 and the component 2 gives reconstituted ready to dilute solution comprising carfilzomib or its pharmaceutically acceptable salts at a concentration of 40 mg/ml and wherein the reconstituted ready to dilute injectable composition provides a dose of 15 mg to 200 mg of carfilzomib or its pharmaceutically acceptable salts in a single step dilution with final infusion media for administering desired concentration to patient; or
   (b) the component 1 comprises carfilzomib or its pharmaceutically acceptable salts and a solvent having concentration of about 60 mg/ml of carfilzomib or its pharmaceutically acceptable salts thereof and is not having more than 3% of impurity during the six month of storage period when stored at 25° C. and 60% relative humidity; and the component 2 is solution of acidifying agent having a pH of 1 to 2; wherein mixing of component 1 and component 2 yields reconstituted ready to dilute solution comprising carfilzomib or its pharmaceutically acceptable salts at a concentration of about 40 mg/ml which is further diluted with infusion media having not more than 10% hemolytic potential.

6. The injectable kit according to claim 5, wherein the component 1 comprises carfilzomib or its pharmaceutically acceptable salts and a solvent having concentration of about 60 mg/ml of carfilzomib or its pharmaceutically acceptable salts thereof and is not having more than 3% of impurity during the six month of storage period when stored at room temperature and 60% RH; and the component 2 is solution of acidifying agent having a pH of about 1 to about 2; wherein mixing of the component 1 and the component 2 gives reconstituted ready to dilute solution comprising carfilzomib or its pharmaceutically acceptable salts at a concentration of 40 mg/ml and wherein the reconstituted ready to dilute injectable composition provides a dose of 15 mg to 200 mg of carfilzomib or its pharmaceutically acceptable salts in a single step dilution with final infusion media for administering desired concentration to patient,
   wherein reconstituted ready to dilute solution has water content not less than 10%.

7. The injectable kit according to claim 5, wherein the component 1 comprises carfilzomib or its pharmaceutically acceptable salts and a solvent having concentration of about 60 mg/ml of carfilzomib or its pharmaceutically acceptable salts thereof and is not having more than 3% of impurity during the six month of storage period when stored at 25° C. and 60% relative humidity; and the component 2 is solution of acidifying agent having a pH of 1 to 2; wherein mixing of component 1 and component 2 yields reconstituted ready to dilute solution comprising carfilzomib or its pharmaceutically acceptable salts at a concentration of about 40 mg/ml which is further diluted with infusion media having not more than 10% hemolytic potential,
   wherein the infusion media selected from saline injection, sterile water for injection or dextrose injection.

8. The injectable kit according to claim 7, wherein the infusion media is 5% dextrose injection.

9. The injectable kit according to claim 5, wherein the component 1 comprises carfilzomib or its pharmaceutically acceptable salts and a solvent having concentration of about 60 mg/ml of carfilzomib or its pharmaceutically acceptable salts thereof and is not having more than 3% of impurity during the six month of storage period when stored at 25° C. and 60% relative humidity; and the component 2 is solution of acidifying agent having a pH of 1 to 2; wherein mixing of component 1 and component 2 yields reconstituted ready to dilute solution comprising carfilzomib or its pharmaceutically acceptable salts at a concentration of about 40 mg/ml which is further diluted with infusion media having not more than 10% hemolytic potential,
   wherein the pH of final infusion media after mixing desired volume of reconstituted ready to dilute is about 2 to about 3.5.

10. The injectable kit according to claim 5, wherein the component 1 comprises carfilzomib or its pharmaceutically acceptable salts and a solvent having concentration of about 60 mg/ml of carfilzomib or its pharmaceutically acceptable salts thereof and is not having more than 3% of impurity during the six month of storage period when stored at 25° C. and 60% relative humidity; and the component 2 is solution of acidifying agent having a pH of 1 to 2; wherein mixing of component 1 and component 2 yields reconstituted ready to dilute solution comprising carfilzomib or its pharmaceutically acceptable salts at a concentration of about 40 mg/ml which is further diluted with infusion media having not more than 10% hemolytic potential, wherein the osmolality of final infusion media after mixing desired volume of reconstituted ready to dilute is about 0.400 to about 1 Osmol/kg.

11. The injectable kit according to claim 5, wherein the component 1 comprises carfilzomib or its pharmaceutically acceptable salts and a solvent having concentration of about 60 mg/ml of carfilzomib or its pharmaceutically acceptable salts thereof and is not having more than 3% of impurity during the six month of storage period when stored at 25° C. and 60% relative humidity; and the component 2 is solution of acidifying agent having a pH of 1 to 2; wherein mixing of component 1 and component 2 yields reconstituted ready to dilute solution comprising carfilzomib or its pharmaceutically acceptable salts at a concentration of about 40 mg/ml which is further diluted with infusion media having not more than 10% hemolytic potential, wherein the volume of reconstituted ready to dilute injectable solution with infusion media is selected from 0.5 ml, 1 ml, 1.25 ml, 1.5 ml, 2 ml, 2.5 ml, 3 ml.

12. The injectable kit according to claim 7, wherein the volume of infusion media is selected from about 50 ml to about 100, ml.

13. The injectable kit according to claim 7, wherein the hemolytic potential of infusion media administered to patient after dilution with reconstituted ready to dilute composition is selected from group consisting of not more than 9%, 8%, 7%, 6%, 5%, 4%, 3%, 2% or 1%.

14. A method for treating patients with relapsed or refractory multiple myeloma comprises:

(a) providing an injectable kit having component 1 and component 2 wherein, the component 1 comprises carfilzomib or its pharmaceutically acceptable salts and a solvent having concentration of about 60 mg/ml of carfilzomib or its pharmaceutically acceptable salts thereof and is not having more than 3% of impurity during the six month of storage period when stored at room temperature and 60% RH; and component 2 is solution of acidifying agent having a pH of 1 to 2; wherein method comprises mixing of component 1 and component 2 to obtain reconstituted ready to dilute solution comprising carfilzomib or its pharmaceutically acceptable salts at a concentration of 40 mg/ml having water content not less than 10%;

(b) providing an injectable kit having component 1 and component 2 wherein, component 1 comprises carfilzomib or its pharmaceutically acceptable salts and a solvent having concentration of about 60 mg/ml of carfilzomib or its pharmaceutically acceptable salts thereof and is not having more than 3% of impurity during the six month of storage period when stored at room temperature and 60% RH; and component 2 is solution of acidifying agent having a pH of 1 to 2; wherein method comprises mixing of component 1 and component 2 to obtain reconstituted ready to dilute solution comprising carfilzomib or its pharmaceutically acceptable salts at a concentration of 40 mg/ml and wherein the reconstituted ready to dilute injectable composition provides a dose of 15 to 200 mg of carfilzomib or its pharmaceutically acceptable salts in a single step dilution with final infusion media for administering to patient; or (c) providing an injectable kit having component 1 and component 2; wherein component 1 comprises carfilzomib or its pharmaceutically acceptable salts and a solvent having concentration of about 60 mg/ml of carfilzomib or its pharmaceutically acceptable salts thereof and is not having more than 3% of impurity during the six month of storage period when stored at 25° C. and 60% relative humidity; and component 2 is solution of acidifying agent having a pH of 1 to 2; wherein method comprises mixing of component 1 and component 2 to obtain reconstituted ready to dilute solution comprising carfilzomib or its pharmaceutically acceptable salts at a concentration of about 40 mg/ml which is further diluted with infusion media having not more than 10% hemolytic potential.

15. A ready to dilute injectable pharmaceutical composition comprising carfilzomib or its pharmaceutical acceptable salts thereof and a solvent; wherein the composition has a concentration of about 60 mg/ml of carfilzomib or its pharmaceutically acceptable salts thereof and contains no more than 0.5% of total impurities upon storage of six months when stored at 25° C. and 60% relative humidity.

16. The composition according to claim 15, wherein the total impurities formed is selected from not more than 0.4% or 0.3% upon storage of six months when stored at 25° C. and 60% relative humidity.

* * * * *